US012520946B2

(12) United States Patent
Odashima et al.

(10) Patent No.: US 12,520,946 B2
(45) Date of Patent: Jan. 13, 2026

(54) CHAIR, CONTROL METHOD, AND STORAGE MEDIUM

(71) Applicant: TOYOTA JIDOSHA KABUSHIKI KAISHA, Toyota (JP)

(72) Inventors: Tadashi Odashima, Seto (JP); Tomio Ikeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 18/318,299

(22) Filed: May 16, 2023

(65) Prior Publication Data

US 2024/0049886 A1 Feb. 15, 2024

(30) Foreign Application Priority Data

Aug. 12, 2022 (JP) ................................ 2022-128869

(51) Int. Cl.

| | |
|---|---|
| ***A47C 9/00*** | (2006.01) |
| ***A47C 3/24*** | (2006.01) |
| ***A47C 7/02*** | (2006.01) |
| ***A61H 1/02*** | (2006.01) |

(52) U.S. Cl.
CPC .............. *A47C 9/002* (2013.01); *A47C 3/245* (2013.01); *A47C 7/02* (2013.01); *A61H 1/0292* (2013.01); *A61H 2205/081* (2013.01)

(58) Field of Classification Search
CPC ................................ A47C 3/245; A47C 9/002
See application file for complete search history.

(56) References Cited

U.S. PATENT DOCUMENTS 5,590,930 A 1/1997 Glockl
7,100,983 B1 * 9/2006 Gant ...................... A47C 3/025 248/656
7,922,247 B2 * 4/2011 Dickie ..................... A47C 7/14 297/264.1
9,661,929 B1 * 5/2017 Koh ....................... A47C 7/445
10,213,024 B2 * 2/2019 Reinhard ................. A47C 9/02
10,610,021 B2 * 4/2020 Toland ............... A47C 1/03222
10,918,211 B2 * 2/2021 Sugano .................. A47C 9/002
11,259,636 B1 * 3/2022 Hsiao ..................... A47C 7/024
(Continued)

FOREIGN PATENT DOCUMENTS

CN 105962670 A * 9/2016
EP 3085274 A1 * 10/2016 ............. A47C 3/026
(Continued)

*Primary Examiner* — Timothy J Brindley
(74) *Attorney, Agent, or Firm* — Oliff PLC

(57) ABSTRACT

The chair of the present disclosure includes a base, a seating surface positioned on the upper side of the base and seated by a user, a base and a seating surface are connected, a seating surface is maintained in a reference state, and a seating surface is inclined from the reference state in accordance with a force applied to the seating surface by the seating of the user in accordance with the reference state; an elastic support post installed on the upper side of the base and rotating about an axis in the vertical direction based on power; a plurality of support posts installed on the upper side of the rotating table and supporting the seating surface at the upper end portion when the seating surface is inclined; and a motor that generates power.

6 Claims, 15 Drawing Sheets

(56) References Cited

U.S. PATENT DOCUMENTS

| | | | | |
|---|---|---|---|---|
| 2011/0278418 | A1* | 11/2011 | Kuo | A47C 3/18 248/425 |
| 2018/0289167 | A1* | 10/2018 | Tedesco | A47C 3/026 |
| 2022/0202641 | A1* | 6/2022 | Reisman | A61H 1/005 |
| 2023/0337827 | A1* | 10/2023 | Pinkelman | A63F 13/28 |

FOREIGN PATENT DOCUMENTS

| | | | | |
|---|---|---|---|---|
| JP | H07-503392 | A | | 4/1995 |
| JP | 2003-235917 | A | | 8/2003 |
| JP | 2005-245638 | A | | 9/2005 |
| KR | 101231028 | B1 | * | 2/2013 |
| KR | 101829827 | B1 | * | 2/2018 |
| KR | 102213428 | B1 | * | 2/2021 |
| KR | 20210053002 | A | * | 5/2021 |
| KR | 20210066488 | A | * | 6/2021 |
| KR | 102692911 | B1 | * | 8/2024 |

* cited by examiner

TOTAL REDUCTION GEAR RATIO 1, 260 : 1

SEATING SURFACE ONLY
2
100

SEATING SURFACE AND BACKREST
7
2
200

SEATING SURFACE AND UPPER ARM
7
2
200

SEATING SURFACE AND HEAD
7
2
200

SEATING SURFACE AND BODY (HANGING)
7
2
200

CHAIR, CONTROL METHOD, AND STORAGE MEDIUM

CROSS-REFERENCE TO RELATED APPLICATION

This application claims priority to Japanese Patent Application No. 2022-128869 filed on Aug. 12, 2022, incorporated herein by reference in its entirety.

BACKGROUND

1. Technical Field

The present disclosure relates to a chair, a control method, and a storage medium.

2. DESCRIPTION OF RELATED ART

Japanese Unexamined Patent Application Publication No. 2003-235917 (JP 2003-235917 A) discloses a chair in which movement of the trunk of a user is induced by changing a seating surface in an entire circumferential direction in a state where the seating surface is fixed so as to be inclined in a predetermined direction. Further, J P 2003-235917 A discloses a chair in which the seating surface is inclined along the inclination of the user by connecting a base and the seating surface with a free joint.

SUMMARY

However, in the chair according to JP 2003-235917 A, since the inclination of the seating surface is fixed, only the muscles used for the specific posture of the user are expected to be tensed. Further, in the chair, since the inclination of the seating surface is determined by the posture of the user, the degree of activity of the muscles with respect to the inclination is expected to be limited. Therefore, in the chair according to JP 2003-235917 A, there is an issue that the user cannot effectively train a plurality of anti-gravity muscles necessary for the user to maintain the posture unconsciously.

In view of such an issue, an object of the present disclosure is to provide a chair, a control method, and a storage medium capable of effectively training the anti-gravity muscles necessary for the user to maintain the posture unconsciously.

A chair according to the present disclosure includes:

a base;

a seating surface located above the base and seated by a user;

an elastic support post that connects the base and the seating surface, maintains the seating surface in a reference state, and allows the seating surface to incline from the reference state in response to a force applied to the seating surface when the user is seated on the seating surface;

a rotating table that is installed on an upper side of the base and that rotates about an axis in an up-down direction based on power;

a plurality of support posts each of which has a different length in the up-down direction, the support posts being installed on an upper side of the rotating table and supporting the seating surface at an upper end portion when the seating surface is inclined; and a motor for generating the power.

In a control method according to the present disclosure, a computer controls rotation of a motor of a chair including:

a base;

a seating surface located above the base and seated by a user;

an elastic support post that connects the base and the seating surface, maintains the seating surface in a reference state, and allows the seating surface to incline from the reference state in response to a force applied to the seating surface when the user is seated on the seating surface;

a rotating table that is installed on an upper side of the base and that rotates about an axis in an up-down direction based on power;

a plurality of support posts each of which has a different length in the up-down direction, the support posts being installed on an upper side of the rotating table and supporting the seating surface at an upper end portion when the seating surface is inclined; and a motor for generating the power.

A storage medium according to the present disclosure stores a program that causes a computer to execute a process of controlling rotation of a motor of a chair including:

a base;

a seating surface located above the base and seated by a user;

an elastic support post that connects the base and the seating surface, maintains the seating surface in a reference state, and allows the seating surface to incline from the reference state in response to a force applied to the seating surface when the user is seated on the seating surface;

a rotating table that is installed on an upper side of the base and that rotates about an axis in an up-down direction based on power;

a plurality of support posts each of which has a different length in the up-down direction, the support posts being installed on an upper side of the rotating table and supporting the seating surface at an upper end portion when the seating surface is inclined; and a motor for generating the power.

According to the present disclosure, it is possible to provide the chair, the control method, and the storage medium capable of effectively training the anti-gravity muscles necessary for the user to maintain the posture unconsciously.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
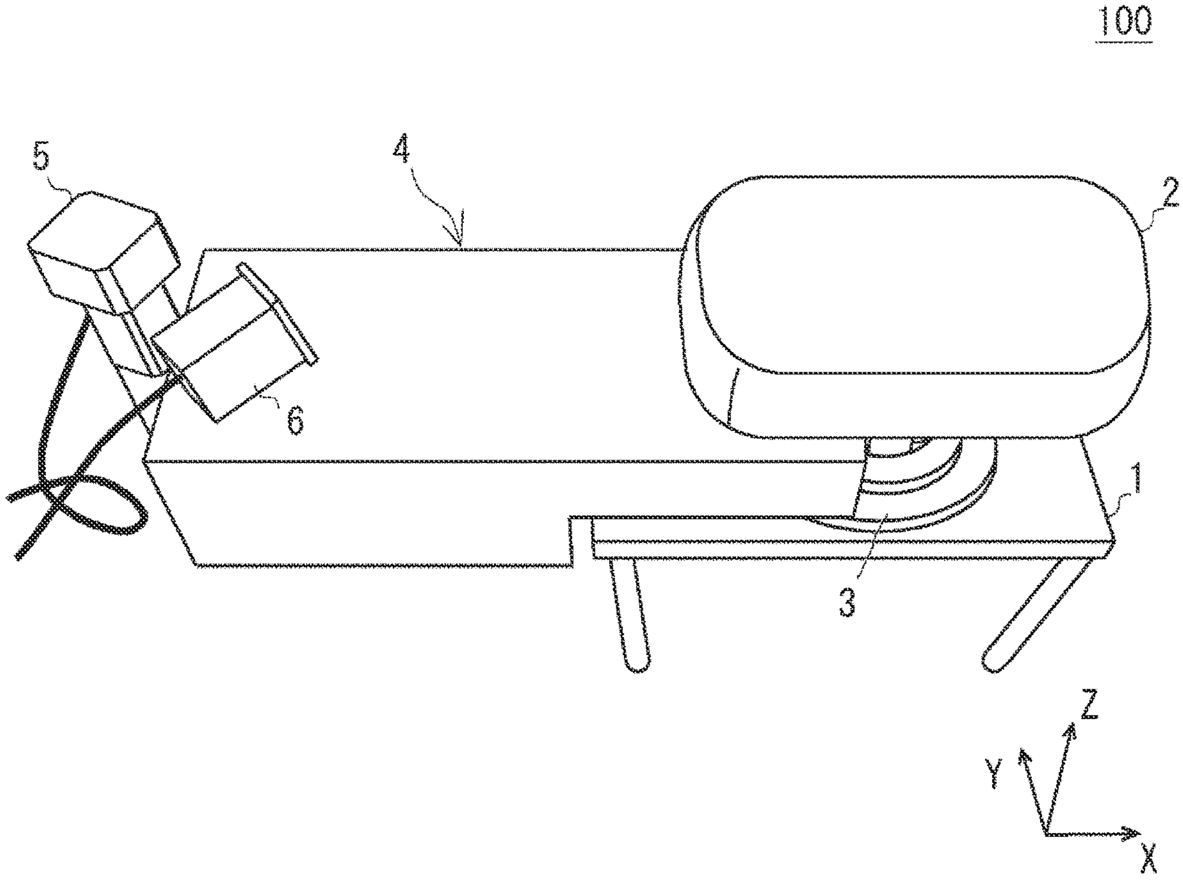
FIG. 1 is a diagram illustrating an example of a configuration of a chair according to a first embodiment.

Hereinafter, specific embodiments to which the present disclosure is applied will be described in detail with reference to the drawings. In the drawings, the same elements are denoted by the same reference numerals, and redundant descriptions are omitted as necessary for clarity of description.

First Embodiment

First, the configuration of the chair 100 according to the first embodiment will be described with reference to FIGS. 1 to 4.

FIG. 1 is a diagram illustrating an example of a configuration of a chair 100. As illustrated in FIG. 1, the chair 100 includes a base 1, a seating surface 2, a support mechanism 3, a power transmission mechanism 4, a motor 5, and a controller 6.

The base 1 is a base on which the components of the chair 100 are mounted.

The seating surface 2 is a seating surface on which the user sits.

The support mechanism 3 is a mechanism that is interposed between the base 1 and the seating surface 2 and supports the seating surface 2. The support mechanism 3 keeps the seating surface 2 in a reference state when the user is not seated on the seating surface 2. The reference state is, for example, a state parallel to a horizontal plane (xy plane). When the user is seated on the seating surface 2, the support mechanism 3 allows the inclination of the seating surface 2 from the reference state and further changes the inclination direction around the axis in the up-down direction (z-axis direction) with time. Specifically, the support mechanism 3 has the configuration shown in FIG. 2.

Figure 2:
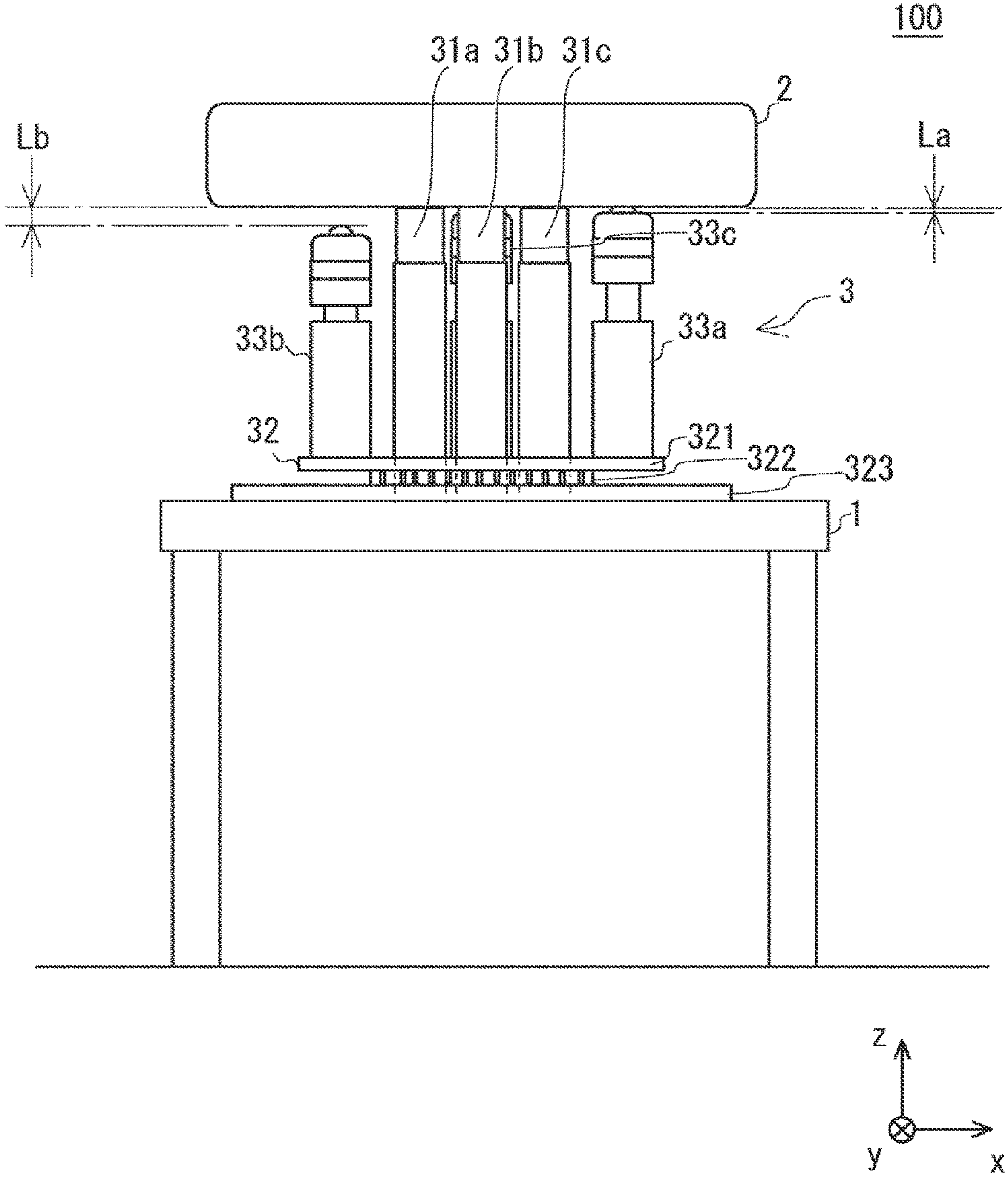
FIG. 2 is a diagram illustrating an example of a configuration of a support mechanism of a chair according to the first embodiment.

FIG. 2 is a diagram illustrating an example of a configuration of the support mechanism 3 of the chair 100. As illustrated in FIG. 2, the support mechanism 3 includes an elastic support post 31, a rotating table 32, and a plurality of support posts 33. For example, the support mechanism 3 includes three elastic support posts 31*a*, elastic support posts 31*b*, and elastic support posts 31*c* as the elastic support posts 31. In addition, the support mechanism 3 includes three support posts 33*a*, a support post 33*b*, and a support post 33*c* as the plurality of support posts 33.

The elastic support post 31 is an elastic columnar member that connects the base 1 and the seating surface 2. The elastic support post 31 keeps the seating surface 2 in a reference state (for example, a state parallel to xy plane, that is, a horizontal state), and when the user is seated on the seating surface 2, the seating surface 2 is allowed to incline from the reference state in accordance with the force applied to the seating surface 2.

The rotating table 32 includes a rotating portion 321, a gear portion 322, and a rotating base portion 323. The rotating portion 321 is, for example, a disk-shaped member, and is installed in the rotating base portion 323 so as to rotate around the vertical direction (z-axis direction) in accordance with the rotation of the gear portion 322. The gear portion 322 is, for example, a pulley interlocked with the rotating portion 321, and teeth to which a belt or the like for receiving power from the power transmission mechanism 4 is attached are provided on the outer peripheral surface. Further, the rotating table 32 includes a penetrating portion (not shown) through which the elastic support post 31 penetrates.

The support post 33 is a columnar member provided on an upper side (z-axis positive direction side) surface of the rotating portion 321 of the rotating table 32. The support post 33 supports the seating surface 2 at the upper end portion 331 when the user sits on the seating surface 2 and the seating surface 2 is inclined. The plurality of support posts 33 are provided on the upper surface of the rotating portion 321 at equal intervals on the circumference, but the locations provided can be set. Specifically, the support post 33 has the configuration shown in FIG. 3.

Figure 3:
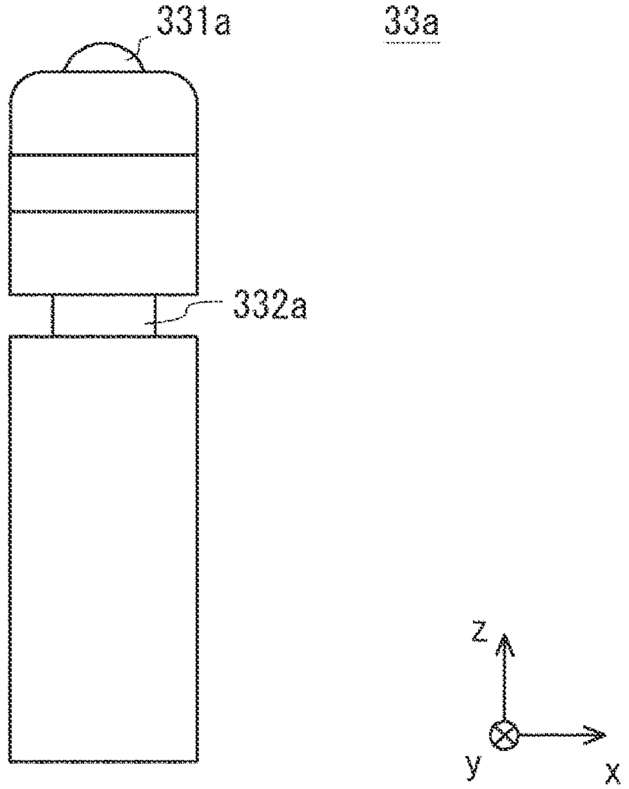
FIG. 3 is a diagram illustrating an example of a configuration of a support post of a chair according to the first embodiment.

FIG. 3 is a diagram illustrating an exemplary configuration of a support post 33*a* of the chair 100. The support post 33*a* comprises an upper end portion 331*a* and a length adjustment portion 332*a*. The upper end portion 331*a* is, for example, a ball-shaped member, and supports the seating surface 2 when the seating surface 2 is inclined. By adopting a ball-shaped member on the upper end portion 331*a*, the rotating table 32 can be rotated with less drag even if the load of the user applied to the seating surface 2 is concentrated in the inclined direction. The length adjust portion 332*a* is, for example, of the screw type and adjusts the length of the support post 33*a*.

Here, the support post 33*b* has a configuration similar to that of the support post 33*a*, that is, an upper end portion 331*b* and a length adjustment portion 332*b*. The support post 33*c* also has a configuration similar to that of the support post 33*a*, that is, an upper end portion 331*c* and a length adjustment portion 332*c*.

Hereinafter, the upper end portion 331*a*, the upper end portion 331*b*, and the upper end portion 331*c* are collectively referred to as an upper end portion 331, and the length adjustment portion 332*a*, the length adjustment portion 332*b*, and the length adjustment portion 332*c* are collectively referred to as a length adjustment portion 332 unless otherwise specified.

The description of FIG. 2 is returned. The length of each of the plurality of support posts 33 in the vertical direction is determined such that the seating surface 2 is inclined at a predetermined angle from the reference state when the user is seated. Here, in order to generate the inclination, at least one of the plurality of support posts 33 is adjusted to have a length in the vertical direction shorter than that of the other support posts 33. For example, the support post 33*b* is adjusted so that the vertical length of the support post 33*a* is shorter. In other words, the length of the support post 33*b* is adjusted so that the distance Lb between the upper end portion 331*b* of the support post 33*b* and the lower side of the seating surface 2 is larger than the distance La between the upper end portion 331*a* of the support post 33*a* and the lower side of the seating surface 2. Further, the support post 33*b* is adjusted so that the vertical length of the support post 33*c* is shorter. Here, the direction and the angle allowing the inclination of the seating surface 2 are determined according to the length of the support post 33*a*, the support post 33*b* and the support post 33*c*. Further, it is preferable that the upper end portion 331*a* of the support post 33*a* and the upper end portion 331*c* of the support post 33*c* are in contact with the lower side of the seating surface 2.

The description of FIG. 1 is returned. The power transmission mechanism 4 includes, for example, a belt and a pulley, or a chain and a sprocket, and transmits power generated by the motor 5 to the rotating table 32 of the support mechanism 3. Specifically, the power transmission mechanism 4 has the configuration shown in FIG. 4.

Figure 4:
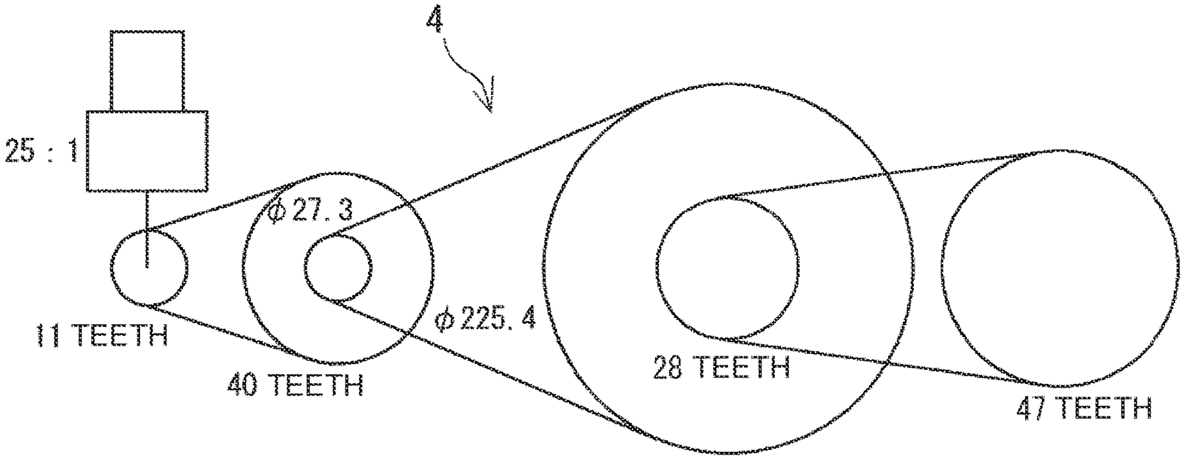
FIG. 4 is a diagram illustrating an example of a configuration of a power transmission mechanism of a chair according to the first embodiment.

FIG. 4 is a diagram illustrating an example of a configuration of the power transmission mechanism 4 of the chair 100. As shown in FIG. 4, the power transmission mechanism 4 has a configuration in which a motor 5 rotating at a reduction ratio of 25:1, a pulley of 11 teeth interlocking with the rotation of the motor 5, a pulley of 40 teeth, a pulley of 28 teeth, and a gear portion 322 of a rotating table 32 of 47 teeth are connected by a belt. In the power transmission mechanism 4, since a high reduction ratio is required for very slow rotation, a very large reduction ratio of 1260:1 is adopted.

The description of FIG. 1 is returned. The motor 5 is, for example, an electric motor, and generates power by rotation.

The controller 6 controls the rotation of the motor 5. For example, the controller 6 can increase or decrease the rotational speed of the motor 5. The controller 6 may switch the increase or decrease of the rotation speed of the motor 5 at predetermined intervals.

Next, an example of the operation of the chair 100 according to the first embodiment will be described.

The user sits on the seating surface 2 of the chair 100. At this time, the seating surface 2 is supported by the plurality of support posts 33 of the support mechanism 3. When at least one of the plurality of support posts 33 is shorter in length than the other support posts 33, the inclination of the seating surface 2 is allowed. Here, the direction and the angle in which the inclination of the seating surface 2 is allowed are determined according to the respective lengths of the plurality of support posts 33.

The user operates the controller 6. The controller 6 controls the rotation of the motor 5 based on the operation of the user. The motor 5 generates power based on the control of the controller 6, and transmits the power to the rotating table 32 of the support mechanism 3 via the power transmission mechanism 4. The rotating portion 321 of the rotating table 32 rotates around the vertical direction axis based on the transmitted power, and rotates the plurality of installed support posts 33 in the same direction. Then, the direction in which the inclination of the seating surface 2 is allowed changes with time.

As described above, in the chair 100 according to the first embodiment, the direction in which the inclination of the seating surface is allowed can be changed over time. These are ensured by the properties of the elastic support posts 31 and the support posts 33. That is, the elastic support post 31 supporting the seating surface 2 maintains the balance of the seating surface 2 when the load deviation of the seating surface 2 is small. The support posts 33 do not function to push up the seating surface 2, but instead support the seating surface 2 when the seating surface 2 is tilted and constantly change its direction over time. By doing so, the chair 100 allows the user to make various inclinations according to the eccentricity, and causes the user to continuously perform the reflexive posture control movement associated therewith, so that the plurality of anti-gravity muscles (muscles corresponding to the inclinations in the entire circumferential direction) necessary for the user to maintain the posture unconsciously can be effectively trained. It should be noted that the chair 100 does not force an inappropriate inclination for the user, and can prevent fixation in a defective posture.

Next, with reference to FIGS. 5 to 15, a result of verifying that the chair 100 according to the first embodiment can effectively induce the movement of the anti-gravity muscles of the user will be described.

Figure 5:
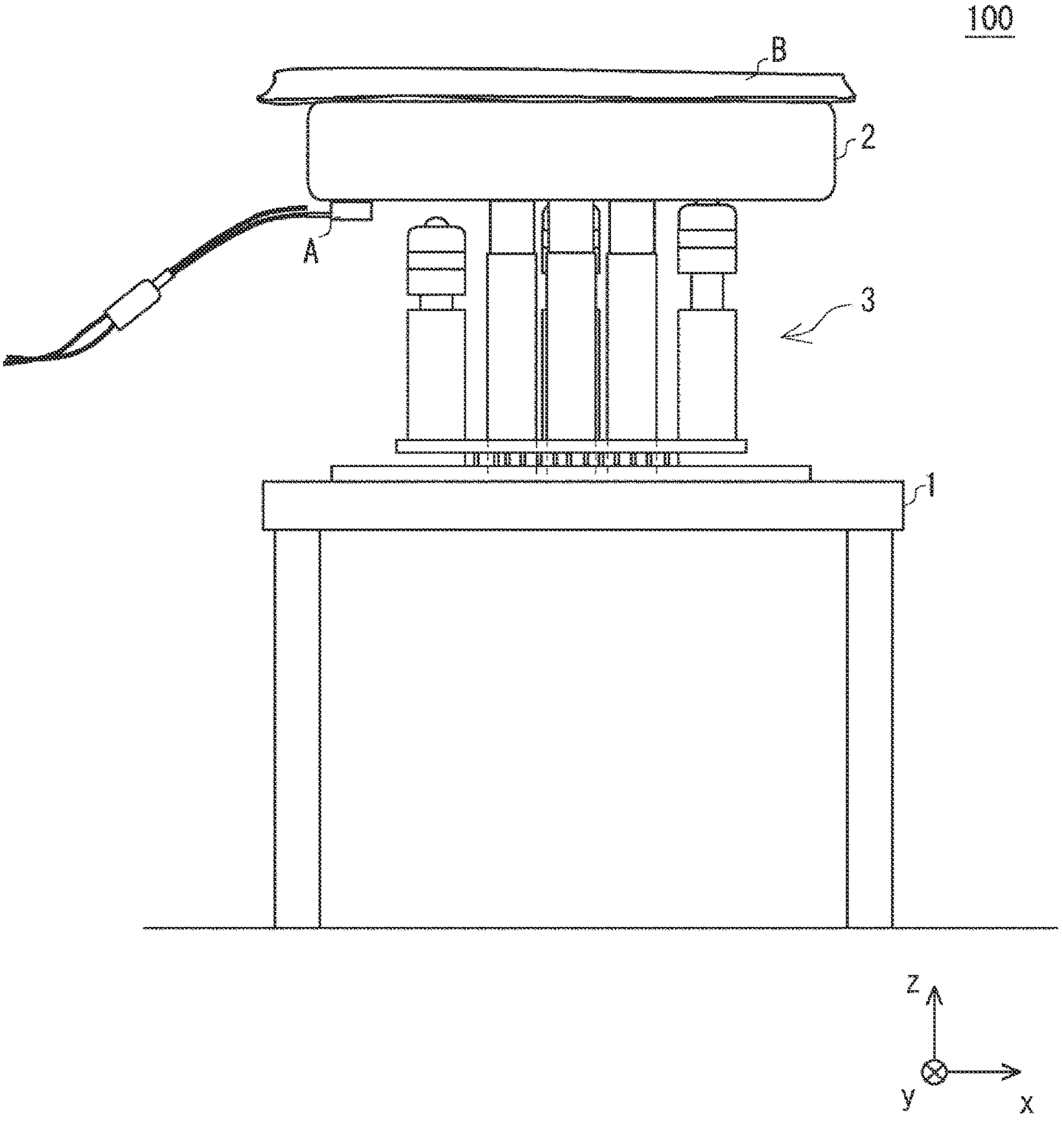
FIG. 5 shows an example of an arrangement of sensors installed on a seating surface of a chair in verification according to the first embodiment.

Firstly, with reference to FIG. 5 to FIG. 7, the arrangement of each sensor used for verification and the way of viewing the data obtained thereby will be described. FIG. 5 shows an example of the arrangement of the sensors installed on the seating surface 2 of the chair 100 in the verification. The acceleration sensor A is for measuring the inclination direction and the inclination angle of the seating surface 2 from the horizontal plane when seated, and is installed on the lower side (the z-axis negative direction side) of the seating surface 2. The surface pressure sensor B is for measuring the transition of the position of the center of gravity of the subject riding on the seating surface 2 at the time of seating, and is installed on the upper side (the positive z-axis direction side) of the seating surface 2.

After the user seated on the seating surface 2 of the chair 100 and the chair 100 started operating, the measurement was performed by the acceleration sensor A. The data shown in FIGS. 6 and 7, for example, were obtained by measurement.

Figure 6:
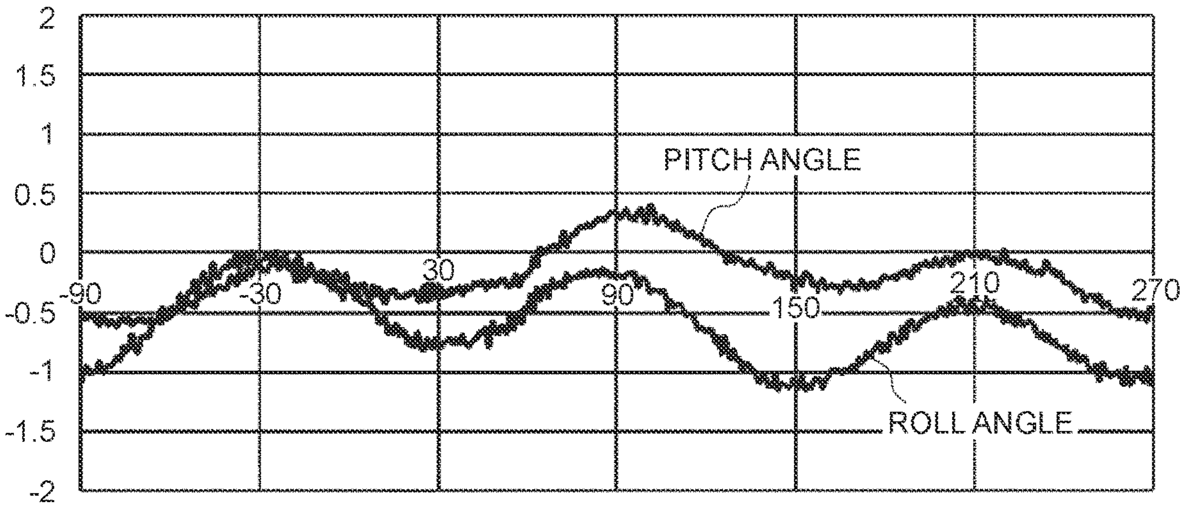
FIG. 6 is an inclination angle diagram illustrating an example of an inclination angle around a pitch axis and an inclination angle around a roll axis measured by the acceleration sensor according to the first embodiment.

FIG. 6 is an inclination angle diagram illustrating an example of an inclination angle around a pitch axis and an inclination angle around a roll axis measured by the acceleration sensor A. The horizontal axis indicates time. The vertical axis represents the inclination angle (deg). Here, the time on the horizontal axis is represented by the azimuth angle (deg) on the polar coordinate system of the reference point. The reference point is provided at a position where the support post 33 is located on the upper surface of the rotating portion 321 of the rotating table 32. The horizontal axis indicates that the reference point is one revolution (270 deg from −90 deg) counter-clockwise from the back of the user.

Figure 7:
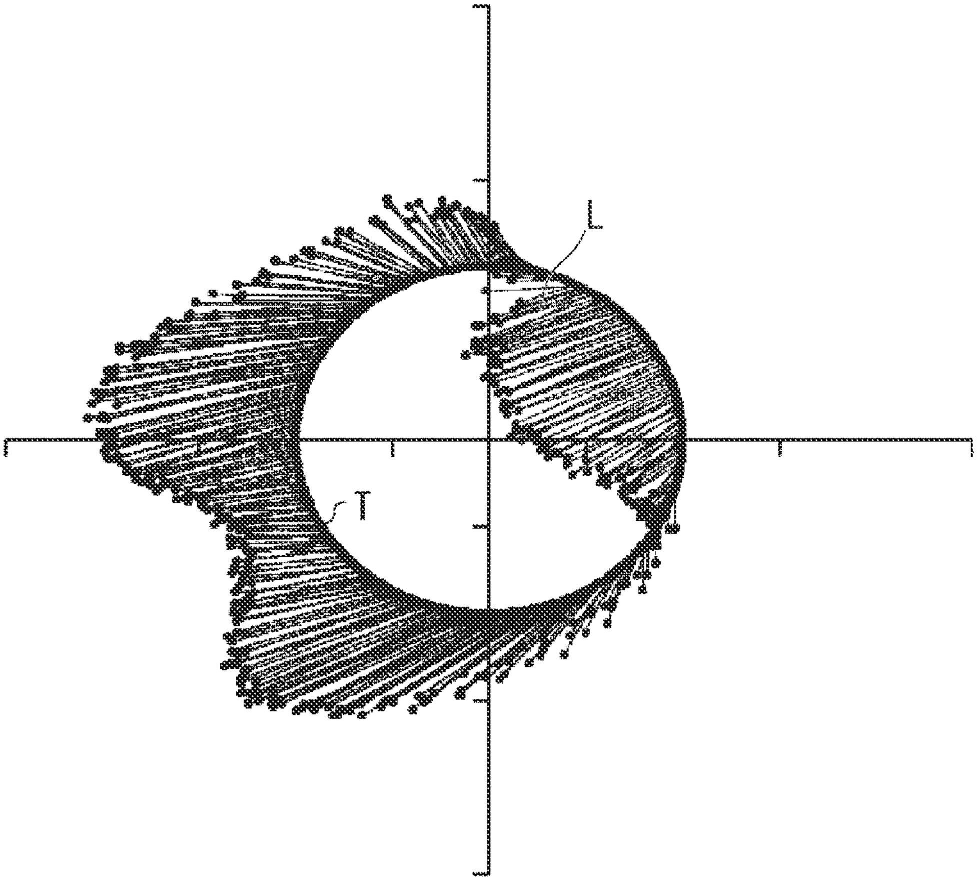
FIG. 7 is an inclination direction diagram showing a position of a reference point and an inclination direction and an inclination angle of the seating surface 2 at a certain time in the chair according to the first embodiment.

FIG. 7 is an inclination direction diagram showing a position of a reference point and an inclination direction and an inclination angle of the seating surface 2 at a certain time. The upward direction, the leftward direction, the downward direction, and the rightward direction of the inclination direction diagram correspond to the forward direction, the leftward direction, the backward direction, and the rightward direction of the user, respectively. The orbit of the reference point becomes a circular orbit T (a circular portion in FIG. 7). A straight line L extending from each point on the circular orbit T of the reference point represents an inclination direction and an inclination angle of the seating surface 2 at that time. The inclination direction and the inclination angle correspond to the data shown in FIG. 6. The direction of the straight line L indicates the inclination direction, and the length of the straight line L indicates the inclination angle. In the following verification, the inclination direction and the inclination angle of the generated seating surface 2 are expressed in an inclination direction diagram.

Next, the relation between the number of support posts 33 contacting the seating surface 2 of the chair 100 and the inclination direction of the seating surface 2 will be verified by using FIGS. 8A, 8B, and 8C to 10A, 10B, and 10C.

After the user seated on the seating surface 2 of the chair 100 and the chair 100 started to operate, the measurement was performed by the acceleration sensor A. The chair 100 used for the measurement has different conditions for the number of support posts 33 in contact with the seating surface 2. The measured data is shown in FIGS. 8A to 8C.

Figure 8A:
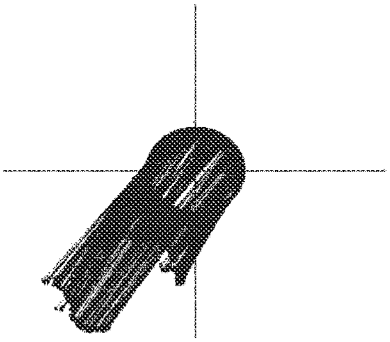
FIG. 8A is an inclination direction view showing an inclination direction and an inclination angle for each number of support posts contacting the seating surface in the chair according to the first embodiment.
Figure 8B:
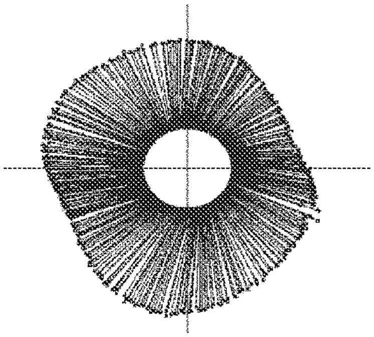
FIG. 8B is an inclination direction view showing an inclination direction and an inclination angle for each number of support posts contacting the seating surface in the chair according to the first embodiment.
Figure 8C:
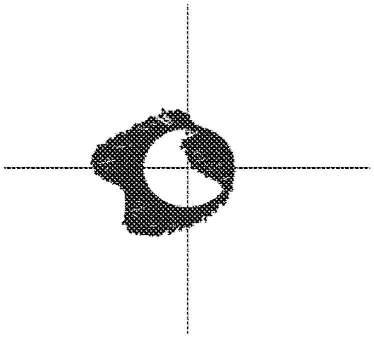
FIG. 8C is an inclination direction view showing an inclination direction and an inclination angle for each number of support posts contacting the seating surface in the chair according to the first embodiment.

FIGS. 8A, 8B, and 8C are inclination direction views showing the inclination direction and the inclination angle of each number of the support posts 33 contacting the seating surface 2.

FIG. 8A shows a situation in which the support posts 33 contacting the seating surface 2 are measured by the 0 chairs 100. For example, in the chair 100, the lengths of the support post 33*a*, the support post 33*b*, and the support post 33*c* are adjusted so that the upper end portions 331 (the upper end portions 331*a*, the upper end portions 331*b*, and the upper end portions 331*c*) do not touch the lower side of the seating surface 2. That is, in the chair 100, the seating surface 2 is supported only by the elastic support post 31.

FIG. 8B shows that the number of support posts 33 in contact with the seating surface 2 is two (that is, one support post 33 not in contact with the seating surface 2) and measured by the chair 100. For example, in the chair 100, the lengths of the support post 33*a*, the support post 33*b*, and the support post 33*c* are adjusted so that the upper end portion 331*a* of the support post 33*a* and the upper end portion 331*c* of the support post 33*c* contact the lower side of the seating surface 2 and do not contact the lower side of the seating surface 2 by the upper end portion 331*b* of the support post 33*b*. In the chair 100, the inclination of the seating surface 2 is allowed in accordance with the distance between the upper end portion 331*b* of the support post 33*b* and the lower side of the seating surface 2 when seated.

FIG. 8C shows a situation in which the support posts 33 contacting the seating surface 2 are measured by the three chairs 100. For example, in the chair 100, the lengths of the support post 33*a*, the support post 33*b*, and the support post 33*c* are adjusted so that the upper end portions 331 (the upper end portions 331*a*, the upper end portions 331*b*, and the upper end portions 331*c*) are contacted with the lower side of the seating surface 2. In the chair 100, the inclination of the seating surface 2 is not allowed when seated.

In FIGS. 8A to 8C, the reference point of the rotating table 32 is set to a particular support post 33 (reference post). In particular, in the two chairs 100 each having a support post 33 in contact with the seating surface 2 shown in FIG. 8B, the reference point of the rotating table 32 is set on the support post 33 that does not contact the seating surface 2.

From FIGS. 8A to 8C show the following. In FIG. 8A, it was found that the inclination of the seating surface 2 is caused to be biased toward the left rear of the user at the reference point, and the inclination of the user's body appears to be the inclination of the seating surface 2. In FIG. 8C, it was found that the inclination of the seating surface 2 is entirely generated to the left of the user at the reference point, and the inclination of the seating surface 2 is suppressed to be small. On the other hand, in FIG. 8B, it was found that the inclination of the seating surface 2 is uniformly generated in the entire circumferential direction of the seating surface 2 according to the position of the reference point. Since the inclination of the seating surface 2 is not deflected in one direction but is uniformly generated in the entire circumferential direction, it was found that the number of the support posts 33 in contact with the seating surface 2 is preferably two. In addition, in FIG. 8B, it was confirmed that the support post 33 that does not contact the seating surface 2, that is, the one support post 33 having a short length is inclined in a certain direction.

Next, the relation between the vertical length of the support post 33 which is not in contact with the seating surface 2 and the inclination angle of the seating surface 2 in the chair 100 having two support posts 33 in contact with the seating surface 2 will be described with reference to FIGS. 9A and 9B.

After the user seated on the seating surface 2 of the chair 100 and the chair 100 started to operate, the measurement was performed by the acceleration sensor A. In the chair 100 used for the measurement, the condition of the vertical length of the support post 33 that does not contact the seating surface 2 is different. The measured data are shown in FIGS. 9A and 9B.

Figure 9A:
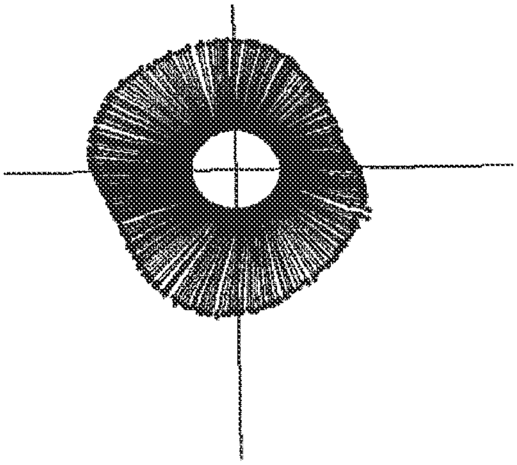
FIG. 9A is an inclination direction view showing an inclination direction and an inclination angle for each length of a support post which does not touch a seating surface in the chair according to the first embodiment.
Figure 9B:
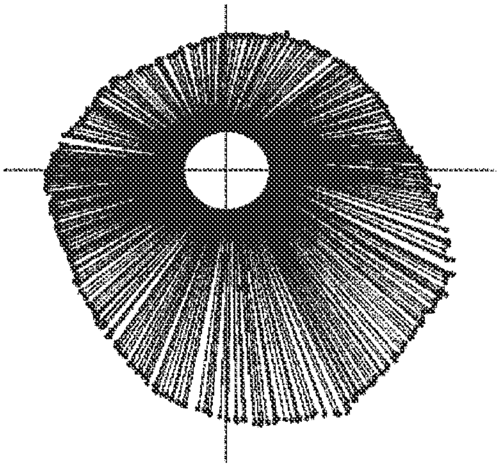
FIG. 9B is an inclination direction view showing an inclination direction and an inclination angle for each length of a support post which does not touch a seating surface in the chair according to the first embodiment.

FIGS. 9A and 9B are inclination direction views showing the inclination direction and the inclination angle for each length of the support post 33 that does not touch the seating surface 2.

FIG. 9A is a consequence of chair 100 where the length of support post 33 that does not contact seating surface 2 has been adjusted such that the upper end portion 331 is 5.3 mm to the lower side of seating surface 2. FIG. 9B is a consequence of chair 100 where the length of support post 33 that does not contact seating surface 2 has been adjusted such that the upper end portion 331 is 18 mm to the lower side of seating surface 2.

As shown in FIGS. 9A and 9B, the length of the support post 33 is adjusted so that the distance between the upper end portion 331 and the lower side of the seating surface 2 is 18 mm from 5.3 mm, that is, when the length of the support post 33 is reduced, the inclination angle of the seating surface 2 is found to be larger.

Next, the relation between the inclination of the seating surface 2 of the chair 100 and the amount of movement of the center of gravity of the user on the seating surface 2 will be verified with reference to FIGS. 10A, 10B, 10C, 11A, 11B, and 11C.

After the user seated on the seating surface 2 of the chair 100 and the chair 100 started to operate, measurement was performed by the acceleration sensor A and the surface pressure sensor B. In the measurement, two chairs 100 each having a support post 33 in contact with the seating surface 2 were used. In the measured chair 100, the conditions of the length of the support post 33 that does not contact the seating surface 2 and the subject are different from each other. Measured data are shown in FIGS. 10A, 10B, 10C, 11A, 11B, and 11C.

Figure 10A:
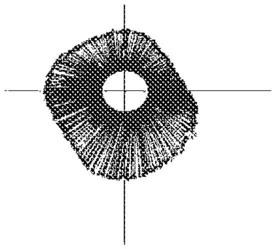
FIG. 10A is an inclination direction diagram showing an inclination direction and an inclination angle of a seating surface for each condition of a length of a support post which does not touch a seating surface and a subject in a chair according to a first embodiment.
Figure 10B:
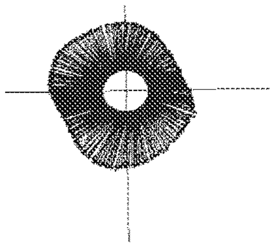
FIG. 10B is an inclination direction diagram showing an inclination direction and an inclination angle of a seating surface for each condition of a length of a support post which does not touch a seating surface and a subject in a chair according to a first embodiment.
Figure 10C:
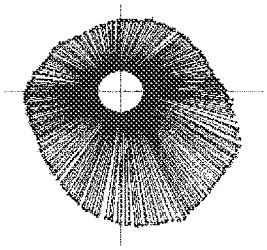
FIG. 10C is an inclination direction diagram showing an inclination direction and an inclination angle of a seating surface for each condition of a length of a support post which does not touch a seating surface and a subject in a chair according to a first embodiment.
Figure 11A:
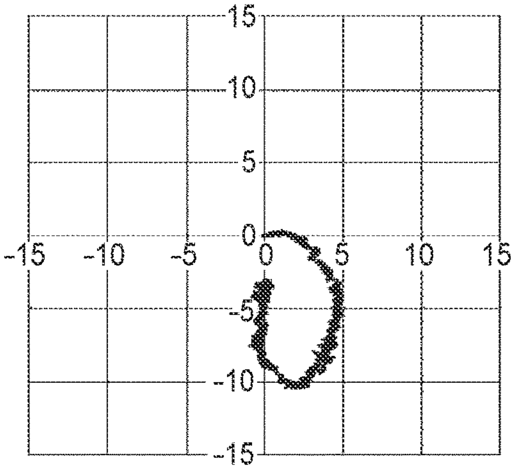
FIG. 11A is a diagram showing a movement amount of the center of gravity of the subject in the chair according to the first embodiment at the seating surface for each condition of the length of the support post that does not touch the seating surface and the subject.
Figure 11B:
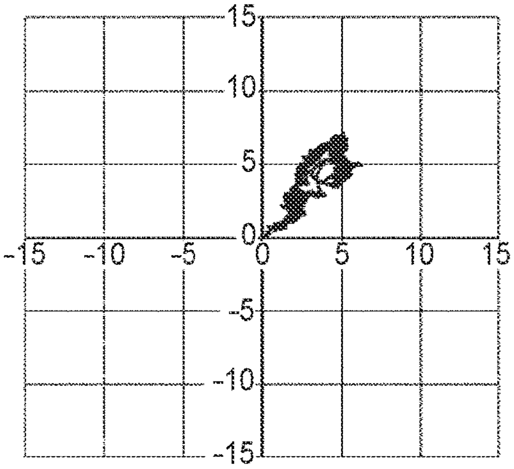
FIG. 11B is a diagram showing a movement amount of the center of gravity of the subject in the chair according to the first embodiment at the seating surface for each condition of the length of the support post that does not touch the seating surface and the subject.
Figure 11C:
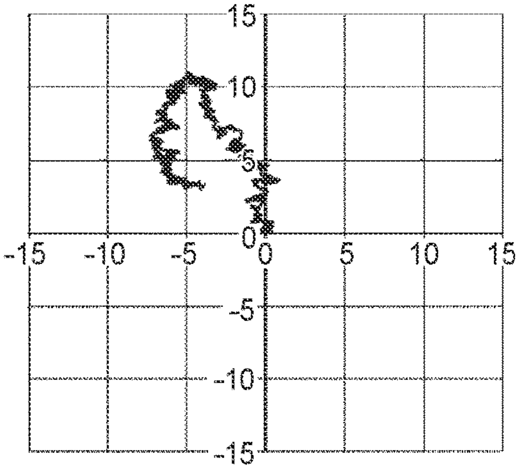
FIG. 11C is a diagram showing a movement amount of the center of gravity of the subject in the chair according to the first embodiment at the seating surface for each condition of the length of the support post that does not touch the seating surface and the subject.

FIGS. 10A, 10B, and 10C are diagrams showing the inclination direction and the inclination angle of the seating surface 2 for each condition of the length of the support post 33 that does not contact the seating surface 2 and the subject. FIGS. 11A, 11B, and 11C are diagrams showing the amount of movement of the center of gravity of the subject on the seating surface 2 for each condition of the length of the support post 33 that does not contact the seating surface 2 and the subject.

FIGS. 10A and 11A are outcomes of a chair 100 in which the length of the support posts 33 not contacting the seating surface 2 is adjusted so that the upper end portion 331 and the lower side of the seating surface 2 are 5.3 mm to each other. In other words, this is the result of the chair 100 adjusted so that the angle (the inclination allowable angle) allowing the inclination of the seating surface 2 becomes 2 deg. In addition, FIGS. 10A and 11A are obtained when a 40 kg sand bag is placed on the seating surface 2 of the chair 100.

FIGS. 10B and 11B are outcomes of a chair 100 in which the length of the support posts 33 not contacting the seating surface 2 is adjusted so that the upper end portion 331 and the lower side of the seating surface 2 are 5.3 mm to each other. In other words, FIGS. 10B and 11B are outcomes of a chair 100 in which the inclination allowable angle allowing the inclination of the seating surface 2 is adjusted to 2 deg. FIGS. 10B and 11B are outcomes of a human being, i.e., a user, sitting on the seating surface 2 of the chair 100.

FIGS. 10C and 11C are outcomes of a chair 100 in which the length of the support posts 33 not contacting the seating surface 2 is adjusted so that the upper end portion 331 and the lower side of the seating surface 2 are 18 mm to each other. In other words, the inclination allowable angle of the seating surface 2 is adjusted to be 8 deg in the chair 100. FIGS. 10C and 11C are outcomes of a human sitting on the seating surface 2 of the chair 100.

The displacement of the center of gravity shown in FIGS. 11A, 11B, and 11C indicates the transition of the position of the center of gravity on the seating surface 2. The change in the position of the center of gravity indicates the amount of change from the origin with the position of the center of gravity immediately after the sand bag is placed or the position of the center of gravity immediately after the person is seated as the origin. One scale is 5 mm.

FIGS. 11A, 11B, and 11C show the following. As shown in FIGS. 11A and 11B, it was found that, even if the allowable inclination angle of the seating surface 2 is the same 2 deg, the blur from the origin of the center of gravity is larger when the sand bag is placed on the seating surface 2 than when the person is seated on the seating surface 2. Therefore, it was proven that the center of gravity control was effective for the seated human. As shown in FIGS. 11A and 11C, it was found that the allowable inclination angle of the seating surface 2 was adjusted from 2 deg to 8 deg, and that the center of gravity shift of the person was almost the same as that of the sand bag. It was also proven that the center of gravity control was always effective for the seated human.

Next, the relation between the center of gravity control by the inclination of the seating surface 2 and the trunk movement of the user, that is, the movement of the spine, will be verified with reference to FIGS. 12A and 12B to FIG. 15.

After the user seated on the seating surface 2 of the chair 100 and the chair 100 started operating, the pressure distribution on the seating surface inclination and the seating surface was measured by the acceleration sensor A and the surface pressure sensor B, respectively. In addition, the motion of the representative point on the spine of the user seated on the seating surface 2 was measured by motion capture. In the measured chair 100, the number of support posts 33 in contact with the seating surface 2 is different. Measurements are shown in FIGS. 12A and 12B to FIG. 15.

Figure 12A:
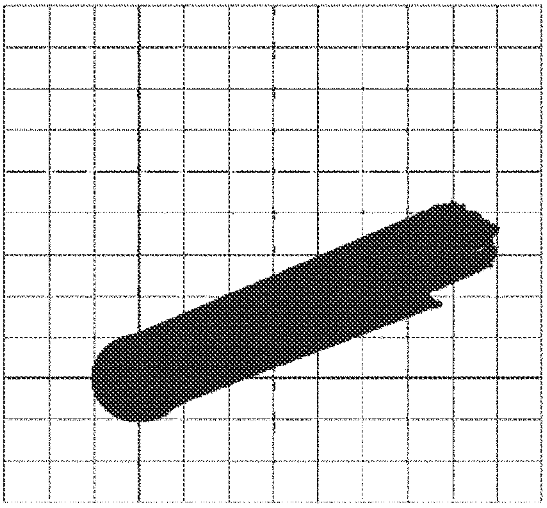
FIG. 12A is an inclination direction view showing an inclination direction and an inclination angle of a seating surface for each number of a support post which does not touch a seating surface in the chair according to the first embodiment.
Figure 12B:
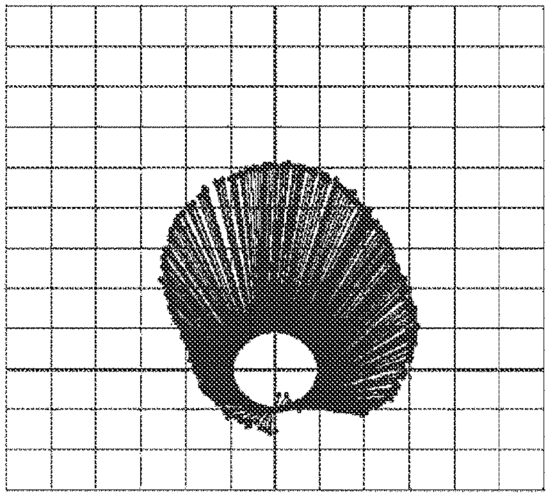
FIG. 12B is an inclination direction view showing an inclination direction and an inclination angle of a seating surface for each number of a support post which does not touch a seating surface in the chair according to the first embodiment.
Figure 13A:
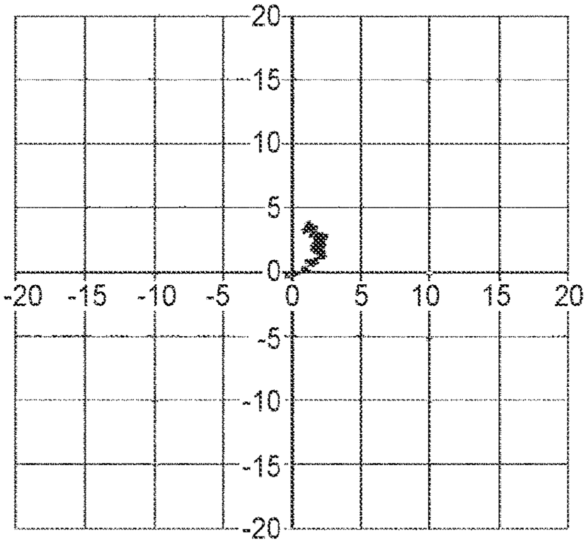
FIG. 13A is a diagram illustrating a movement amount of a center of gravity of a subject on a seating surface for each number of a support post which does not touch a seating surface in the chair according to a first embodiment.
Figure 13B:
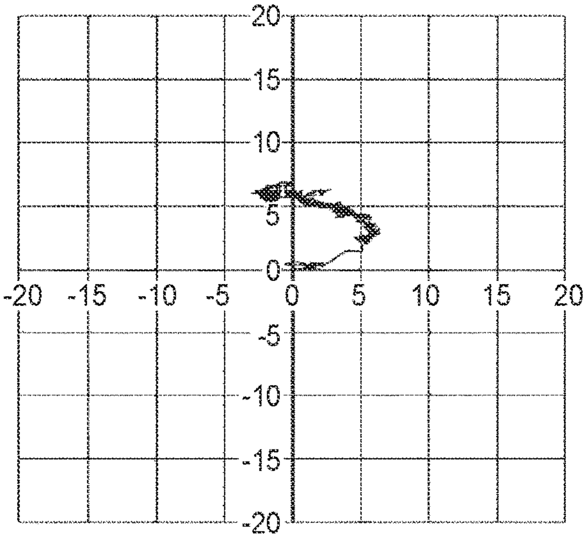
FIG. 13B is a diagram illustrating a movement amount of a center of gravity of a subject on a seating surface for each number of a support post which does not touch a seating surface in the chair according to a first embodiment.
Figure 14C:
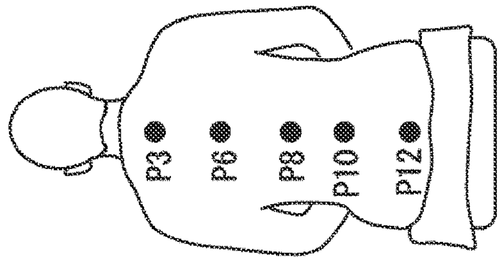
FIG. 14C is a view illustrating a P3, P4, P9, P10 of a representative point on a spine of a user and a movement of a P12 for each number of a support post not contacting a seating surface in a chair according to a first embodiment.
Figure 14B:
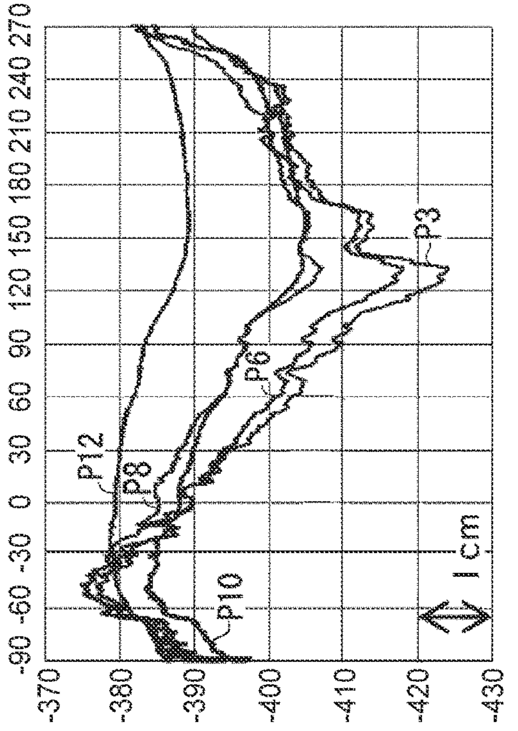
FIG. 14B is a view illustrating a P3, P4, P9, P10 of a representative point on a spine of a user and a movement of a P12 for each number of a support post not contacting a seating surface in a chair according to a first embodiment.
Figure 14A:
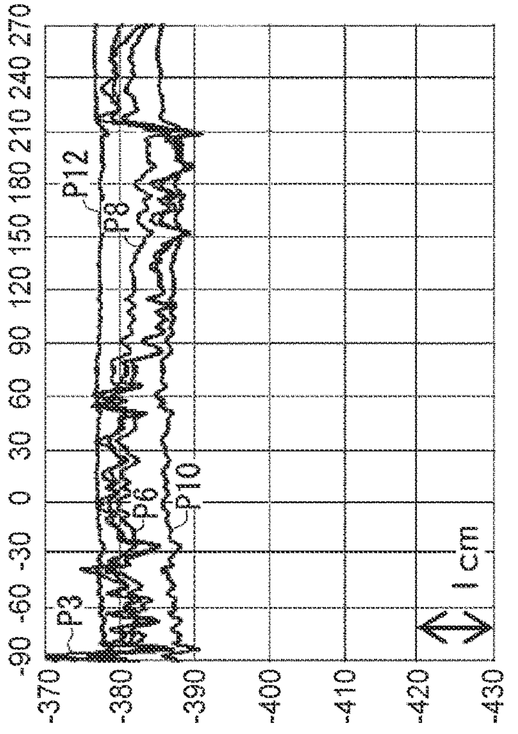
FIG. 14A is a view illustrating a P3, P4, P9, P10 of a representative point on a spine of a user and a movement of a P12 for each number of a support post not contacting a seating surface in a chair according to a first embodiment.

FIGS. 12A and 12B are inclination direction views showing the inclination direction and the inclination angle of the seating surface 2 for each number of the support posts 33 that do not contact the seating surface 2. FIGS. 13A and 13B are diagrams showing the amount of movement of the center of gravity of the subject on the seating surface 2 for each number of support posts 33 that do not touch the seating surface 2. FIGS. 14A, 14B, and 14C are diagrams showing the movement of the representative point P3, P4, P9, P10 and P12 on the spine of the user for each number of support posts 33 that do not touch the seating surface 2.

FIGS. 12A, 13A, and 14A are the consequences of the 0 chairs 100 having support posts 33 contacting the seating surface 2. On the other hand, FIGS. 12B, 13B, and 14B show the consequences of two chairs 100 with support posts 33 contacting the seating surface 2.

FIGS. 14A and 14B are diagrams showing the movement of the representative points P3, P4, P9, P10 and P12 on the user's spine, respectively. The horizontal axis represents the azimuth angle (deg) of the reference point of the rotating table 32 on the polar coordinate system. The horizontal axis indicates that the reference point is one revolution (270 deg from −90 deg) counter-clockwise from the back of the user. The vertical axis represents P3, P4, P9, P10 of a representative point on the spine of the subject and mm of the user from the origin on the coordinate system fixed to the space for each P12. FIG. 14C is a diagram illustrating the positions of the representative points P3, P4, P9, P10 and P12 on the spine of the user.

FIGS. 12A and 12B show that the inclination of the seating surface 2 is universally generated in the whole circumferential direction of the seating surface 2 according to the position of the reference point by making the support posts 33 in contact with the seating surface 2 from 0 to 2. From FIGS. 13A and 13B, it was found that the center of gravity of the user is shifted by changing the number of support posts 33 contacting the seating surface 2 from 0 to 2. From FIGS. 14A and 14B, it was found that the displacement of the position of the representative point P3, P4, P9, P10 and P12 on the spine of the user is more generated by setting the number of support posts 33 contacting the seating surface 2 from 0 to 2. That is, it was found that the movement of the spine of the user was induced. Therefore, it was found that, by making the number of support posts 33 in contact with the seating surface 2 from 0 to 2, the inclination of the seating surface 2 is uniformly generated in the entire circumferential direction of the seating surface 2, and as a result, the movement of the spine of the user due to the movement of the center of gravity of the user is induced.

In addition, the movement of the representative point on the spine of the user in the case of two chairs 100 with the support posts 33 in contact with the seating surface 2 has been verified in detail.

Figure 15:
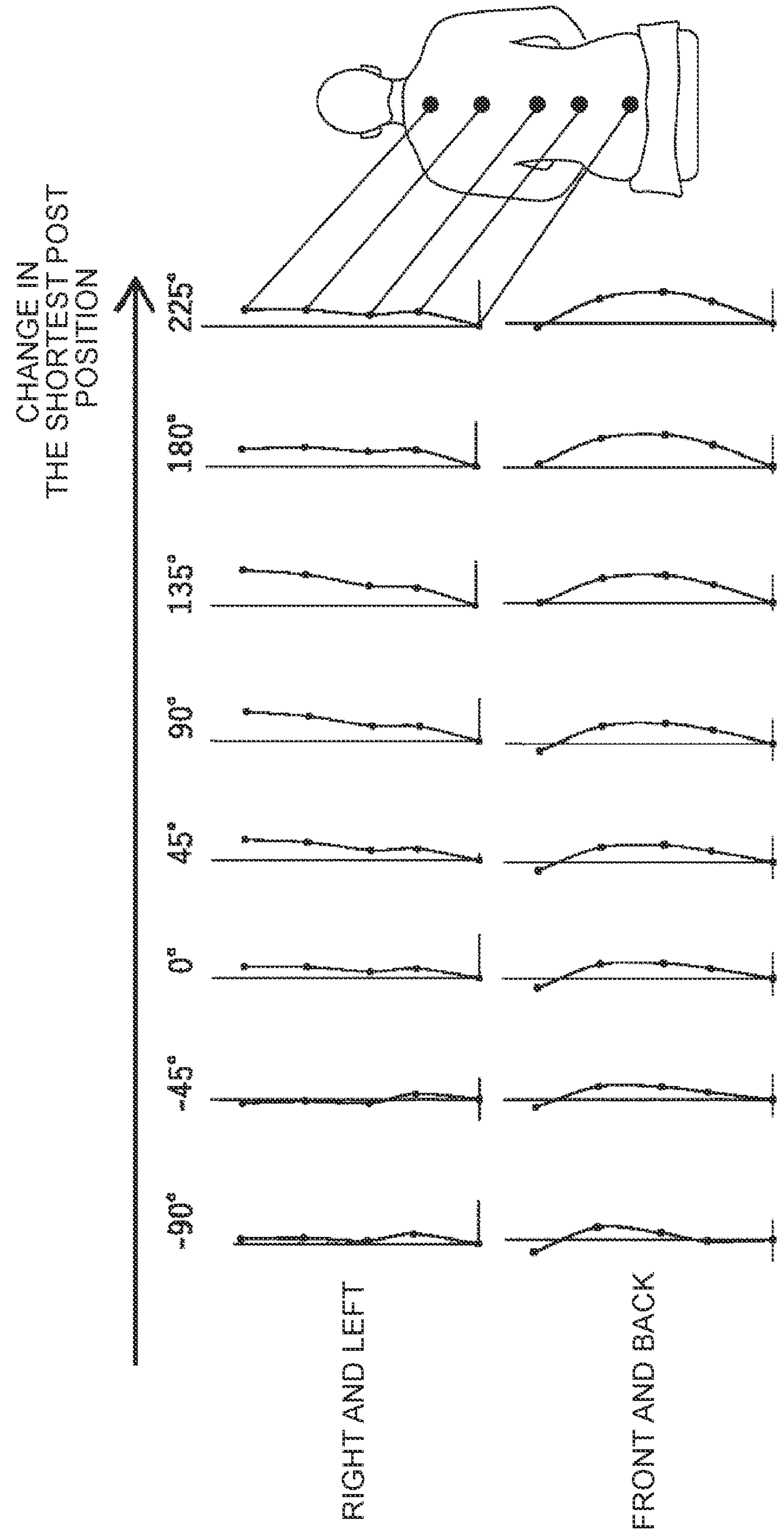
FIG. 15 is a view showing a position of a representative point P3, P4, P9, P10 and a P12 on a spine of a user relative to a P12 in the chair according to the first embodiment.

FIG. 15 is a diagram showing the positions of the representative points P3, P4, P9, P10 and P12 on the spine of the user relative to P12. The horizontal axis of the graph indicates a relative lateral distance of the user with respect to P12 or a longitudinal distance of the user. The vertical axis represents the height relative to P12. The respective charts are arranged in an azimuth angle (deg) order on the polar coordinate system of the reference point of the corresponding rotating table 32.

From FIG. 15, it was found that the spine of the user moves back and forth and left and right by the control of the center of gravity associated with the inclination of the seating surface 2. The user was not conscious of moving the trunk during the test, but this resulted. Since the muscles that change the shape of the spine are caused by the action of the antigravity muscles, which are deep muscles, it is considered that the activity of the deep muscles is induced in an unconscious manner.

Second Embodiment

Next, the configuration of the chair 200 according to the second embodiment will be described with reference to FIGS. 16A to 16E. The chair 200 according to the second embodiment further includes a body support part 7 that supports the body of the user in addition to the chair 100 according to the first embodiment. The body support part 7 supports, for example, a back portion, an upper arm portion, a head portion, or a torso portion of the user. The point (support point) at which the body support part 7 supports the body of the user is a point that hinders the movement of the user. Therefore, the movement of the trunk of the user is changed by the body support part 7. The trunk movement of the user caused by the support by the body support part 7 (=the movement of the spine) varies depending on the position of the support point, for example from FIGS. 16A to 16E.

Figures 16A, 16B, 16C, 16D, 16E:
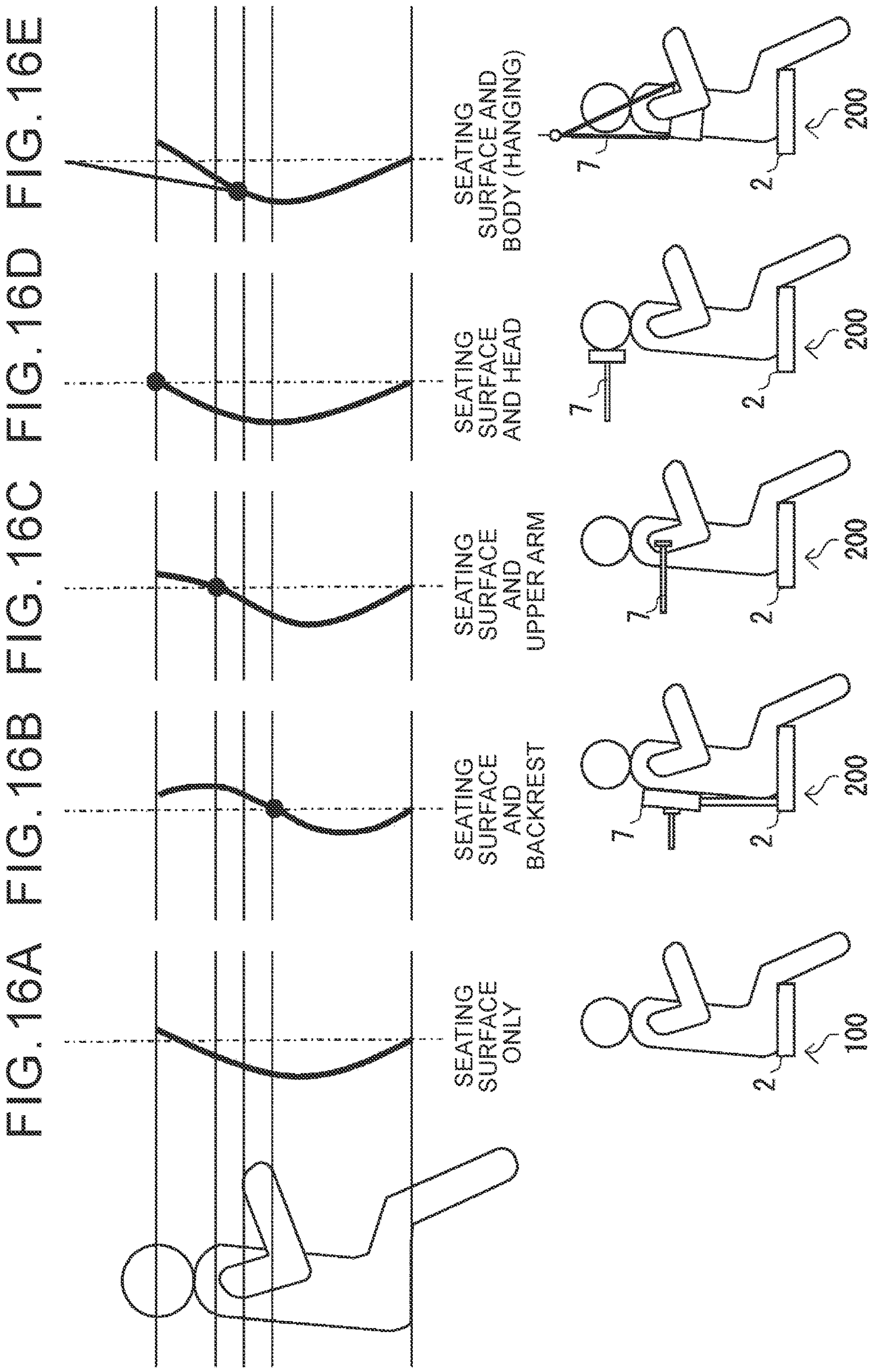
FIG. 16A is a view illustrating the movement of a spine of a user per support point by a body support part in a chair according to a second embodiment.
FIG. 16B is a view illustrating the movement of a spine of a user per support point by a body support part in a chair according to a second embodiment.
FIG. 16C is a view illustrating the movement of a spine of a user per support point by a body support part in a chair according to a second embodiment.
FIG. 16D is a view illustrating the movement of a spine of a user per support point by a body support part in a chair according to a second embodiment.
FIG. 16E is a view illustrating the movement of a spine of a user per support point by a body support part in a chair according to a second embodiment.

FIGS. 16A to 16E show the movement of the user's spine by means of the body support part 7 per point of support. FIG. 16A shows the movement of the spine of the user in the absence of a point of support by the body support part 7. FIG. 16B shows the movement of the spine of the user when the support point by the body support part 7 is the back. FIG. 16C shows the movement of the spine of the user when the point of support by the body support part 7 is the upper arm. FIG. 16D shows the movement of the spine of the user when the point of support by the body support part 7 is the head. FIG. 16E shows the movement of the spine of the user when the support point by the body support part 7 is the torso.

As shown in FIGS. 16A to 16E, it is conceivable that the movement of the spine of the user changes around the support point. As a result, it can be expected to induce more diverse movements by generating changes in the active muscles.

The present disclosure is not limited to the above embodiment, and can be appropriately modified without departing from the spirit.

Modification

It should be noted that the elastic modulus of the elastic support posts 31 may be set, and may be different for each of the elastic support posts 31. The number of the elastic support posts 31 may be any number as long as it balances the seating surface 2 in the absence of support of the support posts 33. The thickness of each of the elastic support posts 31 may be set, and may be different for each of the elastic support posts 31.

The number of support posts 33 may be any number as long as it is three or more. In addition, there is no limitation on the number of support posts 33 that are brought into contact with the lower side of the seating surface 2. The length adjustment portion 332 of the support post 33 is not limited to a screw type as long as it can sufficiently support the load from the seating surface 2 due to the seating. In addition, the length adjustment portion 332 may employ an actuator for adjusting the length of the support post 33 and perform control via the controller. In this case, it is also possible to allow the inclination of the seating surface without using the rotating table 32 by synchronously controlling the lengths of the plurality of support posts 33. The length adjustment portion 332 may further acquire information from the acceleration sensor A that measures the inclination of the seating surface 2 and the surface pressure sensor B that measures the surface pressure of the seating surface 2, thereby creating an allowable inclination according to the state of the user.

The power transmission mechanism 4 is not limited to a belt and a pulley or a chain and a sprocket. The transmission may be by a gear train.

The motor 5 is not limited to an electric motor as long as an output sufficient for driving the support mechanism 3 is obtained with respect to a load caused by seating.

Figure 17:
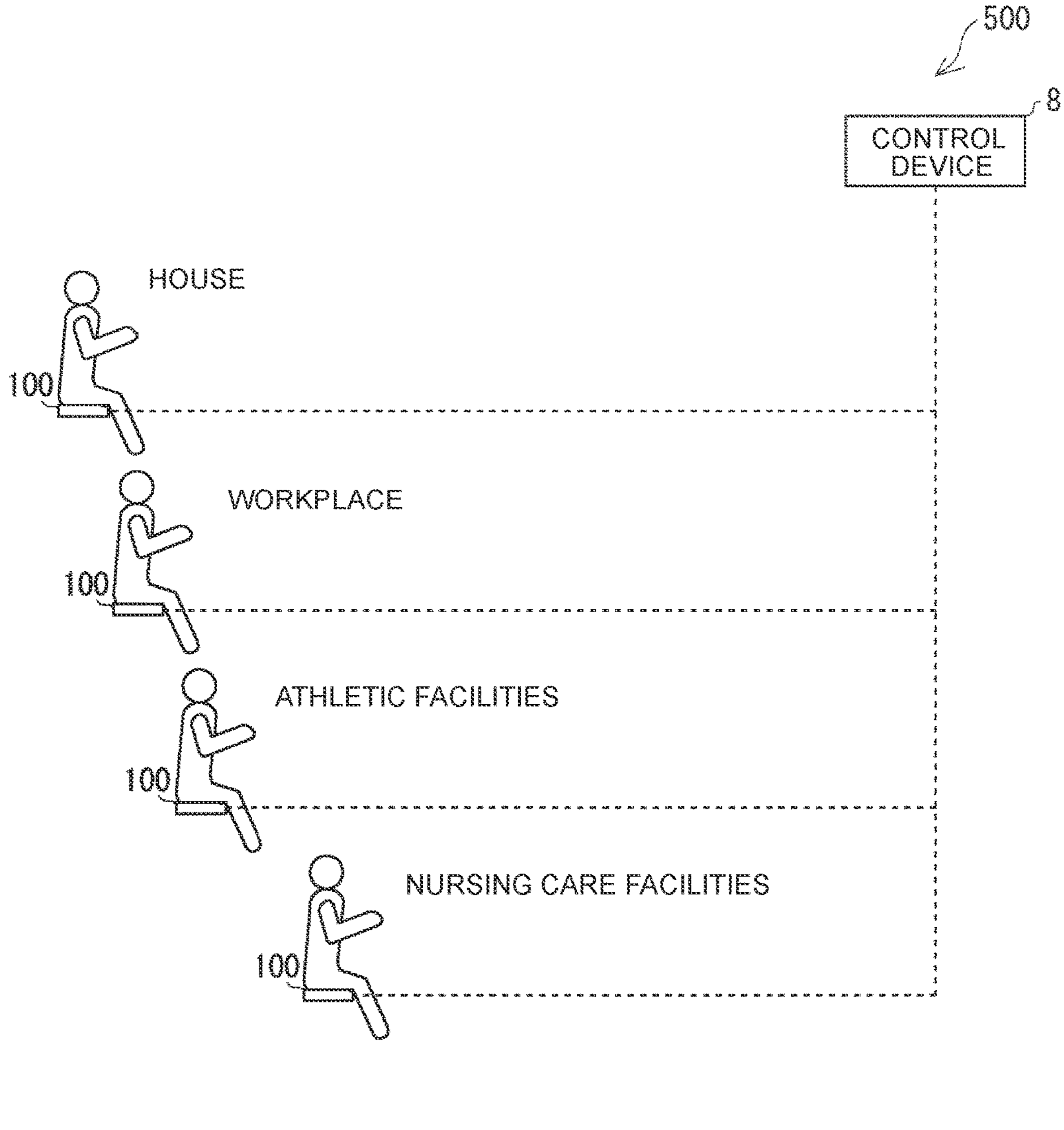
FIG. 17 is a diagram illustrating an example of a configuration of a control system for a chair according to the first embodiment.

Further, as shown in FIG. 17, a configuration may be adopted in which the control system 500 includes the control device 8 that controls the chair 100.

The control device 8 is a computing device, a server, or the like, and communicates with the chair 100 by wireless communication or wired communication to control the rotation of the motor 5 of the chair 100. Specifically, the control device 8 receives data related to the operation status from the chair 100. The control device 8 also transmits a control signal to the chair 100 to control the rotation of the motor 5. For example, the control device 8 may increase or decrease the rotational speed of the motor 5. Note that the control device 8 may switch the increase or decrease of the rotation speed of the motor 5 at predetermined intervals. Here, the control device 8 may be used instead of the controller 6 of the chair 100.

The control device 8 may control the plurality of chairs 100. For example, the control device 8 controls a chair 100 at home, a chair 100 at work, a chair 100 at an athletic facility, and a chair 100 at a care facility.

The control device 8 is configured by hardware or software, or both, and may be configured by one hardware or software, or may be configured by a plurality of hardware or software. The control process of the control device 8 may be realized by a computer having a processor such as Central Processing Unit (CPU) and a memory as a storage device. For example, a program for performing a control process according to the embodiment may be stored in a memory, and each function may be realized by executing a program stored in the memory by a processor.

These programs include instructions (or software code) that, when loaded into a computer, cause the computer to perform one or more of the functions described in the embodiments. The program may be stored in a non-transitory computer-readable medium or a tangible storage medium. By way of example, and not limitation, computer-readable media or tangible storage media include random-access memory (RAM), read-only memory (ROM), flash memory, solid-state drive (SSD) or other memory techniques, CD-ROM, digital versatile disc (DVD), Blu-ray disk or other optical disk storage, magnetic cassettes, magnetic tape, magnetic disk storage or other magnetic storage devices. The program may be transmitted on a transitory computer-readable medium or a communication medium. The example of the transitory computer-readable medium or the communication medium includes, but is not limited to, an electrical, optical, acoustic, or other form of propagating signal.

What is claimed is:

1. A chair comprising:

a base;

a seating surface located above the base and upon which a user sits;

an elastic post that connects the base and the seating surface, wherein the elastic post is configured to maintain the seating surface in a reference state and incline the seating surface from the reference state in response to a force applied to the seating surface when the user is seated on the seating surface;

a power transmission mechanism;

a disc;

a first support post and a second support post that are installed on an upper side of the disc and that support the seating surface at an upper end portion of at least one of the first support post and the second support post in a case where the seating surface is inclined;

a motor configured to generate power;

a first sensor; and a second sensor, wherein:

the power transmission mechanism is configured to transmit the power to the disc, the disc is installed on an upper side of the base and is configured to rotate about an axis in an up-down direction based on the power received from the power transmission mechanism, the first support post contacts a lower side of the seating surface, a length in the up-down direction of the second support post is shorter than a predetermined length of the first support post, the first sensor is:

installed on the lower side of the seating surface; and configured to measure an inclination direction of the seating surface with respect to a horizontal plane and an inclination angle of the seating surface with respect to the horizontal plane in a case where the user is seated, and the second sensor is:

installed on an upper side of the seating surface; and configured to measure transition of a position of center of gravity of a subject that rides on the seating surface in a case where the user is seated.

2. The chair according to claim 1, wherein the length of the first support post in the up-down direction and the length of the second support post in the up-down direction are set such that the seating surface is inclined at a predetermined angle from the reference state in a case where the user sits on the seating surface.

3. The chair according to claim 1, further comprising a controller configured to increase or decrease rotational speed of the motor.

4. The chair according to claim 1, further comprising:

a first actuator; and a second actuator, wherein the first actuator is provided on the first support post and is configured to adjust the length of the first support post in the up-down direction, and the second actuator is provided on the second support post and is configured to adjust the length of the second support post in the up-down direction.

5. The chair according to claim 1, further comprising a body support part configured to support a part of a body of the user, wherein the body support part is configured to maintain at least one of a fixed back portion, a fixed upper arm portion, a fixed head portion, and a fixed torso portion of the user.

6. The chair according to claim 3, wherein the controller is configured to switch increase or decrease of the rotational speed at a predetermined interval.

* * * * *